(12) United States Patent
Tien

(10) Patent No.: US 9,284,726 B2
(45) Date of Patent: Mar. 15, 2016

(54) PYRAMID WAFFLE CORE STRUCTURE AND METHOD OF FABRICATION

(71) Applicant: The Boeing Company, Chicago, IL (US)

(72) Inventor: Allan Tien, Tukwilla, WA (US)

(73) Assignee: The Boeing Company, Chicago, IL (US)

(*) Notice: Subject to any disclaimer, the term of this patent is extended or adjusted under 35 U.S.C. 154(b) by 26 days.

(21) Appl. No.: 14/245,418

(22) Filed: Apr. 4, 2014

(65) Prior Publication Data

US 2015/0284945 A1 Oct. 8, 2015

(51) Int. Cl.
| | |
|---|---|
| *F02K 1/82* | (2006.01) |
| *B32B 3/12* | (2006.01) |
| *E04B 1/84* | (2006.01) |
| *B32B 3/26* | (2006.01) |
| *B32B 5/02* | (2006.01) |
| *B32B 7/04* | (2006.01) |
| *B32B 37/00* | (2006.01) |

(Continued)

(52) U.S. Cl.
CPC ... *E04B 1/84* (2013.01); *B32B 3/26* (2013.01); *B32B 3/30* (2013.01); *B32B 5/024* (2013.01); *B32B 5/028* (2013.01); *B32B 5/24* (2013.01); *B32B 7/045* (2013.01); *B32B 37/0084* (2013.01); *B32B 37/146* (2013.01); *B32B 37/18* (2013.01); *B32B 37/20* (2013.01); *G10K 11/172* (2013.01); *B32B 37/12* (2013.01); *B32B 2250/03* (2013.01); *B32B 2262/02* (2013.01); *B32B 2262/04* (2013.01); *B32B 2262/101* (2013.01); *B32B 2262/103* (2013.01); *B32B 2262/106* (2013.01); *B32B 2307/102* (2013.01); *B32B 2310/0843* (2013.01); *B32B 2607/00* (2013.01); *B64D 2033/0206* (2013.01); *Y10T 156/10* (2015.01)

(58) Field of Classification Search
USPC .......... 181/213, 214, 210, 288, 292; 428/179, 428/178, 116
See application file for complete search history.

(56) References Cited

U.S. PATENT DOCUMENTS

| 2,933,122 A | * | 4/1960 | Christman | ...................... 72/341 |
| 2,952,579 A | * | 9/1960 | Merriman | ..................... 428/118 |

(Continued)

FOREIGN PATENT DOCUMENTS

| EP | 1633935 B1 | 1/2011 |
| FR | 2839995 A1 | 11/2003 |

OTHER PUBLICATIONS

Extended European Search Report dated Sep. 7, 2015.

*Primary Examiner* — Edgardo San Martin
(74) *Attorney, Agent, or Firm* — John S. Economou

(57) ABSTRACT

A structural core and associated method of forming such structure is disclosed. The structure includes a single layer of at least two rows of hollow pyramid-like structures. The hollow pyramid-like structures dampen acoustic noise and provide a truss-like structure that provides a high level of stiffness against transverse loads, shear stresses and side-loading. The hollow pyramid-like structures preferably have upward facing and downward facing open bases, and are formed in rows and columns. To aid in sound attenuation, the single layer is formed from a partially porous material, a woven thermoplastic, woven carbon fiber, fiberglass and paper. To provide additional structural integrity, the single layer is formed from a solid non-porous material such as a metal. The structural core may be included within outer panels to form acoustical or structural panels.

20 Claims, 5 Drawing Sheets

(51) Int. Cl.
*B32B 37/14* (2006.01)
*B32B 37/18* (2006.01)
*B32B 37/20* (2006.01)
*B32B 5/24* (2006.01)
*B32B 3/30* (2006.01)
*G10K 11/172* (2006.01)
*F02K 1/78* (2006.01)
*B32B 3/10* (2006.01)
*B32B 37/12* (2006.01)
*B64D 33/02* (2006.01)

(56) References Cited

U.S. PATENT DOCUMENTS

| | | | | |
|---|---|---|---|---|
| 3,131,789 A * | 5/1964 | Watter | ............................ | 428/116 |
| 3,872,564 A * | 3/1975 | Myers et al. | ................... | 428/593 |
| 4,261,433 A * | 4/1981 | Propst | ............................ | 181/286 |
| 4,457,963 A * | 7/1984 | Ittner et al. | ................... | 428/34.1 |
| 4,981,744 A * | 1/1991 | Swank | ......................... | 428/116 |
| 5,126,183 A * | 6/1992 | Smith, II | ....................... | 428/118 |
| 5,437,936 A * | 8/1995 | Johnson | ......................... | 428/593 |
| 5,922,438 A * | 7/1999 | Scharkowski | ................. | 428/116 |
| 6,871,725 B2 | 3/2005 | Johnson | | |
| 6,920,958 B2 | 7/2005 | Harrison | | |
| 7,267,196 B2 | 9/2007 | Mathur | | |
| 7,484,593 B2 | 2/2009 | Braun et al. | | |
| 8,066,098 B2 | 11/2011 | Ayle | | |
| 8,302,733 B2 * | 11/2012 | Peiffer et al. | .................. | 181/292 |
| 8,336,804 B2 | 12/2012 | Hoetzeldt et al. | | |
| 8,353,240 B1 | 1/2013 | Schaedler et al. | | |
| 8,481,143 B2 * | 7/2013 | Dean et al. | ...................... | 428/80 |
| 8,999,482 B2 * | 4/2015 | Tanii et al. | ...................... | 428/116 |
| 2004/0163888 A1 | 8/2004 | Johnson | | |
| 2009/0123709 A1* | 5/2009 | Straza | ............................ | 428/179 |
| 2014/0349082 A1* | 11/2014 | Tien | ............................... | 428/179 |
| 2015/0004371 A1* | 1/2015 | Noble | ............................ | 428/178 |

\* cited by examiner

PYRAMID WAFFLE CORE STRUCTURE AND METHOD OF FABRICATION

FIELD

This disclosure relates to a pyramid waffle core structure and a method of fabrication thereof.

BACKGROUND

Acoustic panels and other objects may include acoustic core structures for acoustic absorption in various applications. For example, jet engines often include thrust reverser blocker doors that advantageously include an acoustic structure to absorb a portion of the noise created by the jet engine. Other less-demanding applications for acoustic structures include theaters, broadcasting studios, or offices. Acoustic panels typically include a structural honeycomb core modified for acoustical sound dampening that is adhered to a panel, film, or other portion. The modifications may include the additional of a septum layer or the filling of some or all of the cell, for example, and invariably add expense in the manufacturing process. In addition, although a panel having a honeycomb core generally provides a high level of stiffness with respect to transverse loads, such panels provide less than optimal results when subjected to shear stresses and side-loading.

Accordingly, there is a need for a structural core and method of forming such core that is less costly and provides better resistance to shear stresses and side-loading.

SUMMARY

In one aspect, a structural core has a single layer of adjacent hollow pyramid-like structures. The single layer has at least two rows of the hollow pyramid-like structures. Each of the hollow pyramid-like structures has an open base. The hollow pyramid-like structures may have upward facing bases, downward facing bases, or alternate upward facing and downward facing bases. The single layer of hollow pyramid-like structures may be formed in rows and columns of adjacent hollow pyramid-like structures. In one further embodiment, the single layer may be formed from a partially porous material. The partially porous material may be one of a woven thermoplastic, woven carbon fiber, fiberglass and paper. In another further embodiment, the single layer may be formed from a solid non-porous material. The solid non-porous material may be a metal.

In another aspect, a structural core is provided that includes a plurality of rows bonded together laterally. Each row is formed from two ribbons. Each ribbon has upper and lower edges forming a zig-zag pattern having an upper point and a lower point. Each upper point of the zig-zag pattern on the upper edge is directly above an adjacent upper point of the zig-zag pattern on the lower edge. Each lower point of the zig-zag pattern on the upper edge is directly above an adjacent lower point on the lower edge. The two ribbons are bonded together along bonding lines running from each lower point of the zig-zag pattern on the upper edge to the two adjacent upper points of the zig-zag pattern on the lower edge. Each ribbon has bend lines running from each upper and lower points of the zig-zag pattern on the upper edge to the adjacent respective upper and lower points of the zig-zag pattern on the lower edge. The upper points of the zig-zag pattern on the upper edge and the lower points of the zig-zag pattern on the lower edge expand laterally as the two ends of the row are moved together, forming adjacent hollow pyramid-like structures having alternate upward-facing and downward-facing open bases. The plurality of rows may be bonded together by bonding vertices of each pyramid-like structure in each row to the adjacent row. The ribbons may be formed from a partially porous material. The partially porous material may be one of a woven thermoplastic, woven carbon fiber, fiberglass and paper. In another further embodiment, the ribbons may be formed from a solid non-porous material. The solid non-porous material may be a metal.

In a still further aspect, a method of forming a structure is provided. A plurality of ribbons are formed. Each ribbon has upper and lower edges forming a zig-zag pattern having an upper point and a lower point. Each upper point of the zig-zag pattern on the upper edge is directly above an adjacent upper point of the zig-zag pattern on the lower edge and each lower point of the zig-zag pattern on the upper edge is directly above an adjacent lower point on the lower edge. Next, a plurality of rows are formed. Each row is formed from two ribbons bonded together along bonding lines running from each lower point of the zig-zag pattern on the upper edge to the two adjacent upper points of the zig-zag pattern on the lower edge. Each ribbon has bend lines running from each upper and lower points of the zig-zag pattern on the upper edge to the adjacent respective upper and lower points of the zig-zag pattern on the lower edge. The upper points of the zig-zag pattern on the upper edge and the lower points of the zig-zag pattern on the lower edge expand laterally as the two ends of the row are moved together, forming adjacent hollow pyramid-like structures having alternate upward-facing and downward-facing open bases. Finally, the plurality of rows are bonded together laterally to create an acoustic core having a plurality of rows and columns of adjacent hollow pyramid-like structures. The bonding step may be performed by bonding vertices of each hollow pyramid-like structures in each row to the adjacent row. In further embodiments, the structural core may be formed into a predetermined contoured shape or a predetermined angled shape. In another further embodiment, panels may be bonded to a respective upper and lower surface of the structural core to create a panel structure including the structural core sandwiched between the two panels.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
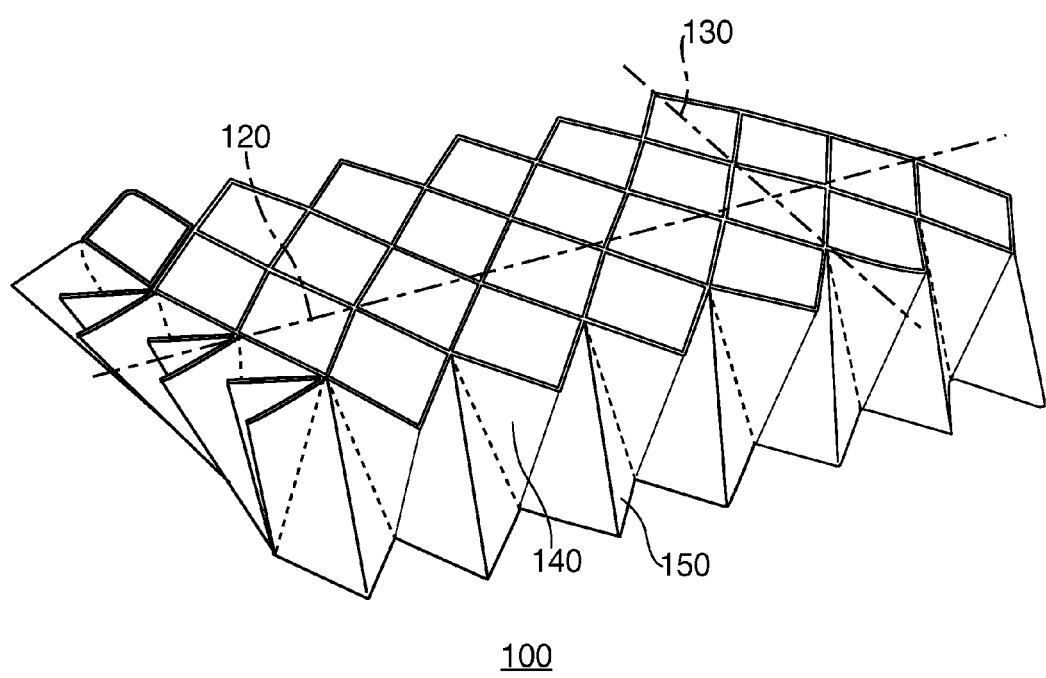
FIG. 1 is a diagram showing a pyramid waffle core according to the present disclosure.

Referring now to FIG. 1, a pyramid waffle core structure 100 is shown according to the present disclosure. Pyramid waffle core structure 100 is formed from rows (shown by dotted line 120) and columns (shown by dotted line 130) of adjacent hollow pyramid (or nearly pyramid) structures having alternate upward facing open bases, e.g., pyramid 140, and downward facing open bases, e.g., pyramid 150. Waffle core structure 100 provides significant benefit over prior methods, for example filled or partially filled honeycomb structures, because the pyramid-like structures are all closed-off without the additional effort required to fill some or all of the open honeycomb spaces. Furthermore, the adjacent pyramid-like structures provide a truss-like structure that, when formed into panels as discussed herein, provides strong support against transverse loads, shear stresses and side-loads. The pyramid waffle core structure 100 is shown for illustrative purposes and, can include as many rows and columns necessary to achieve a desired panel width or length, respectively. Further, in alternative embodiments, pyramids with only upward facing or downward facing open bases may be provided.

The pyramid waffle core structure 100 of FIG. 1 is formed by combining a series of rows of hollow pyramid-like structures, each row aligned along the apex of each hollow pyramid-like structure. Although each pyramid-like structure forms an apex in the embodiment shown in FIG. 1, in other alternative embodiments the pyramid-like structure may have alternative top-most surfaces, for example rounded or flattened tops. Also, in the presently preferred embodiment shown in the Figures, each pyramid-like structure has a square base but in alternative embodiments the base of the pyramid-like structure may have other shapes. For example, in alternative embodiments the base of the pyramid-like structure may be triangular or pentagonal. In the preferred embodiment, a row of hollow pyramid-like structures is formed from two ribbons 210 shown in FIG. 2. The ribbons 210 are formed from a suitable core material, for example a metal (e.g., aluminum), woven thermoplastic, woven carbon fiber, fiberglass, paper, etc. Although the ribbons 210 may be formed from any material that can be formed in the manner shown and discussed with respect to FIG. 3A, woven or other partially porous materials provide better sound absorption than solid materials, while solid non-porous materials provide better structural integrity than partially porous materials. As one of ordinary skill in the art will readily recognize, in certain applications, e.g., a core for acoustical panels, partially porous materials are preferred while in other applications, e.g., structural panels, solid non-porous panels are preferred.

Figure 2:
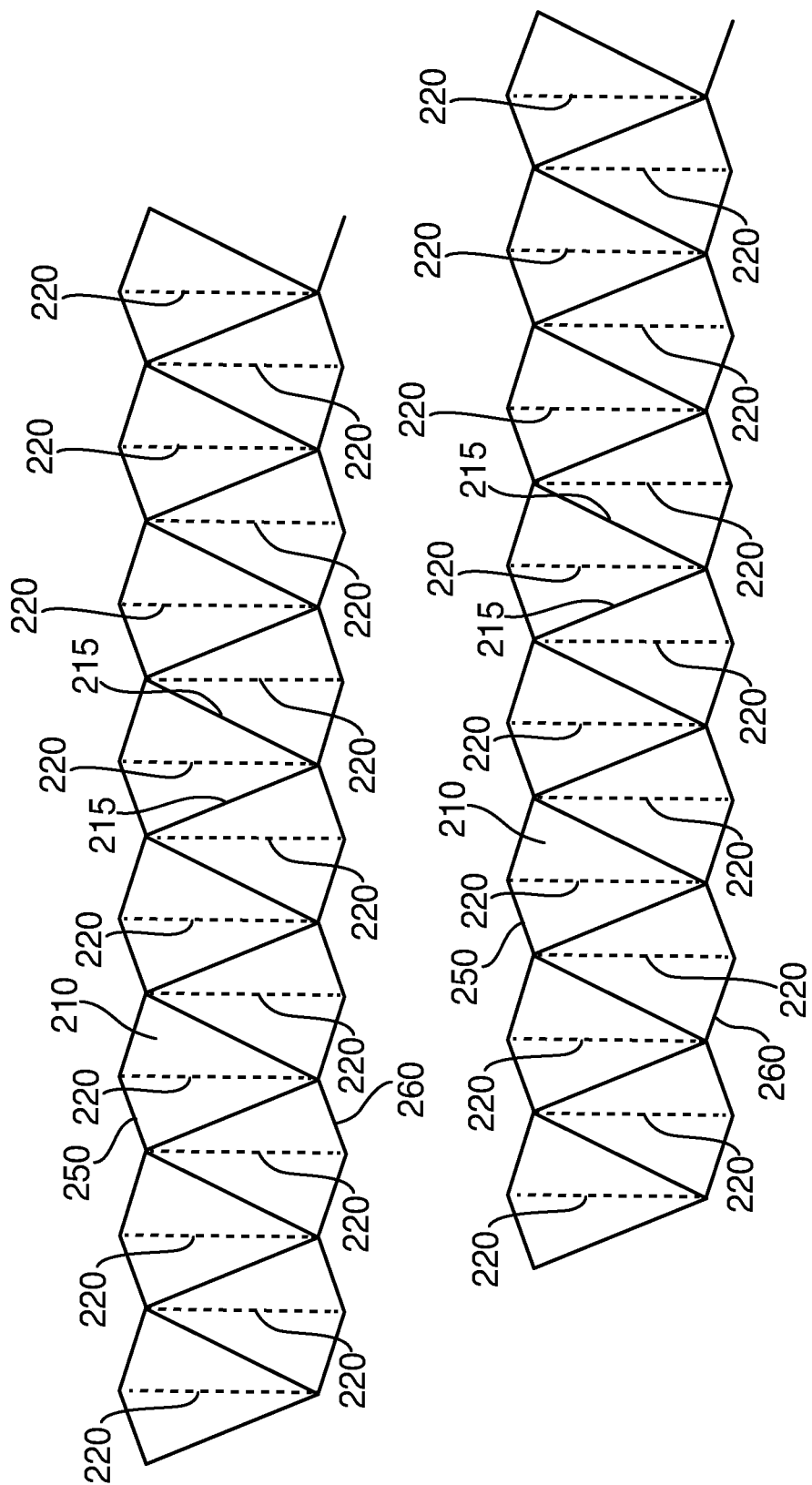
FIG. 2 is a side view of two ribbons used to form a row of the pyramid waffle core according to the present disclosure.
Figure 3A:
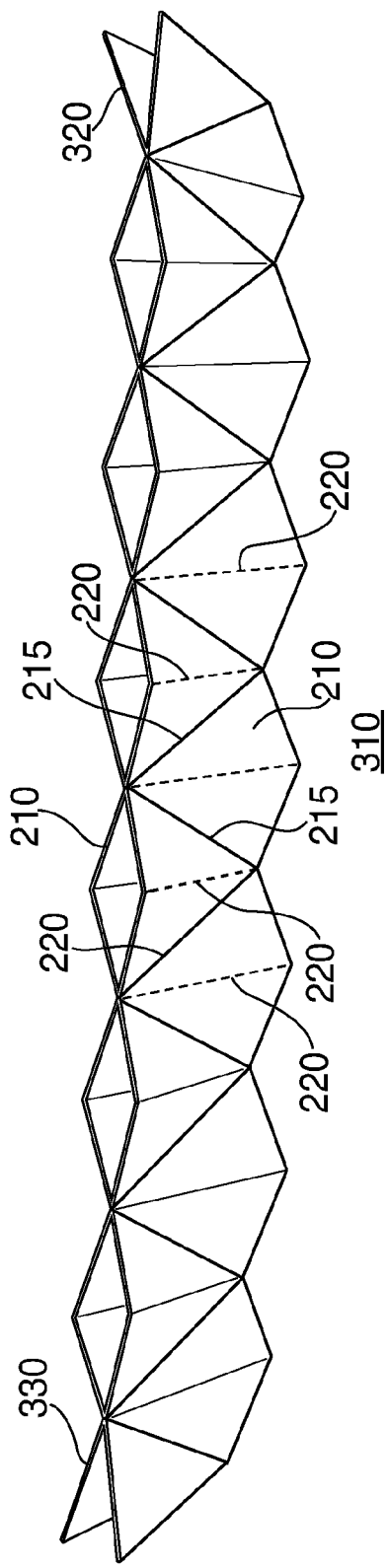
FIGS. 3A and 3B are perspective views showing the formation of rows of the pyramid waffle core according to the present disclosure.
Figure 3B:
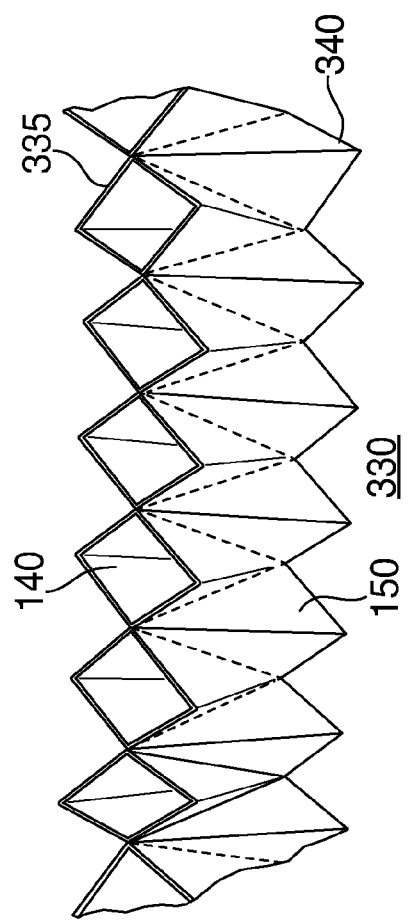

Referring now to FIG. 2, each ribbon 210 has a zig-zag pattern in the upper edge 250 and lower edge 260. Each ribbon 210 is folded along mating lines 215 and bend lines 220, and then bonded together along the mating lines 215 on each ribbon 210, as shown in FIG. 3A, to form a row 310. As one of ordinary skill in the art will readily recognize, the bonding may be done in any way appropriate for the material used to form ribbon 210. After bonding, row 310 is converted to a finished row 320 by pressing end 320 and end 330 together until the pyramid 140 with an upward facing open base and pyramid 150 with a downward facing open base have the proper shape due to the bend lines 220. In particular, as the ends move together, the bend lines 220 cause the inner vertices of each pyramid to move together until upper edge 335 and lower edge 340 of row 330 each form a flat surface and each separate open section forms a proper pyramid shape, as shown in FIG. 3B. Each row 310 preferably has an end to end length, when properly formed as in FIG. 3B, equal to, at least, the desired width or length of the finished panel. Furthermore, the height of each row 310 is chosen to provide a particular thickness for the finished pyramid waffle core structure 100.

Figure 4A:
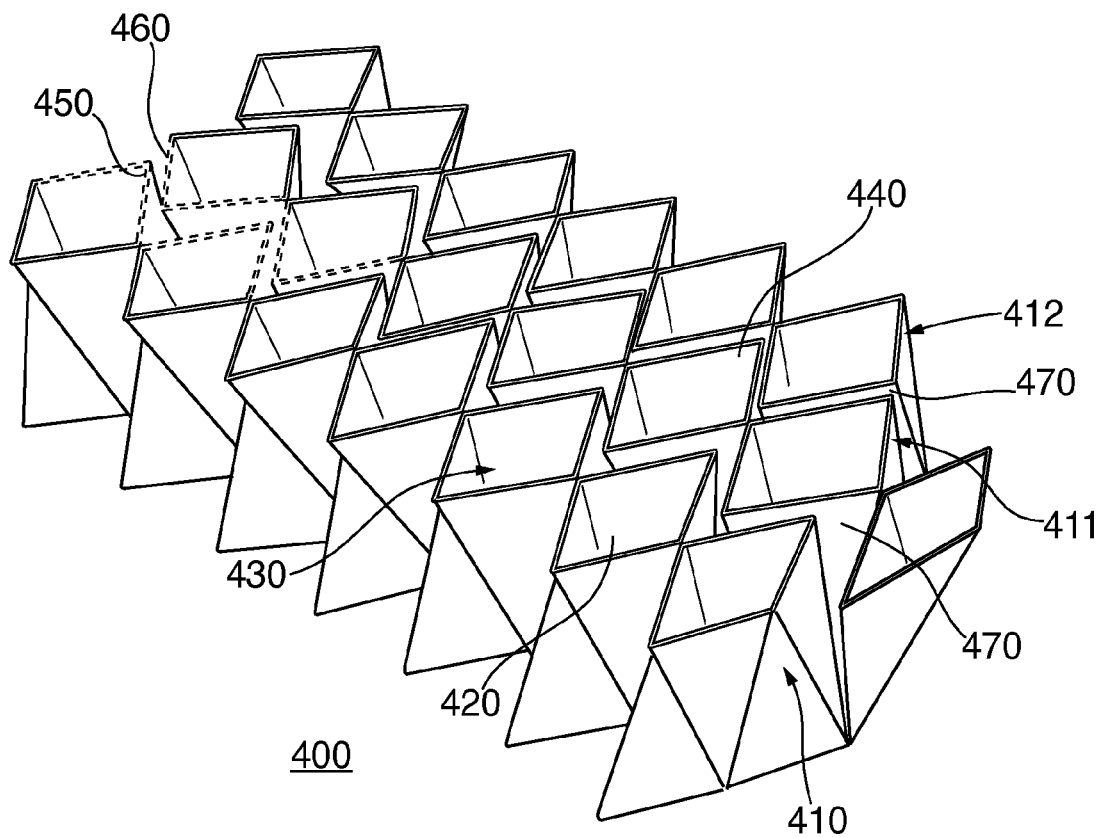
FIG. 4A is a perspective view and FIG. 4B is a top view that both show how three of the rows shown in FIGS. 3A and 3B fit together to form a portion of the pyramid waffle core according to the present disclosure.
Figure 4B:
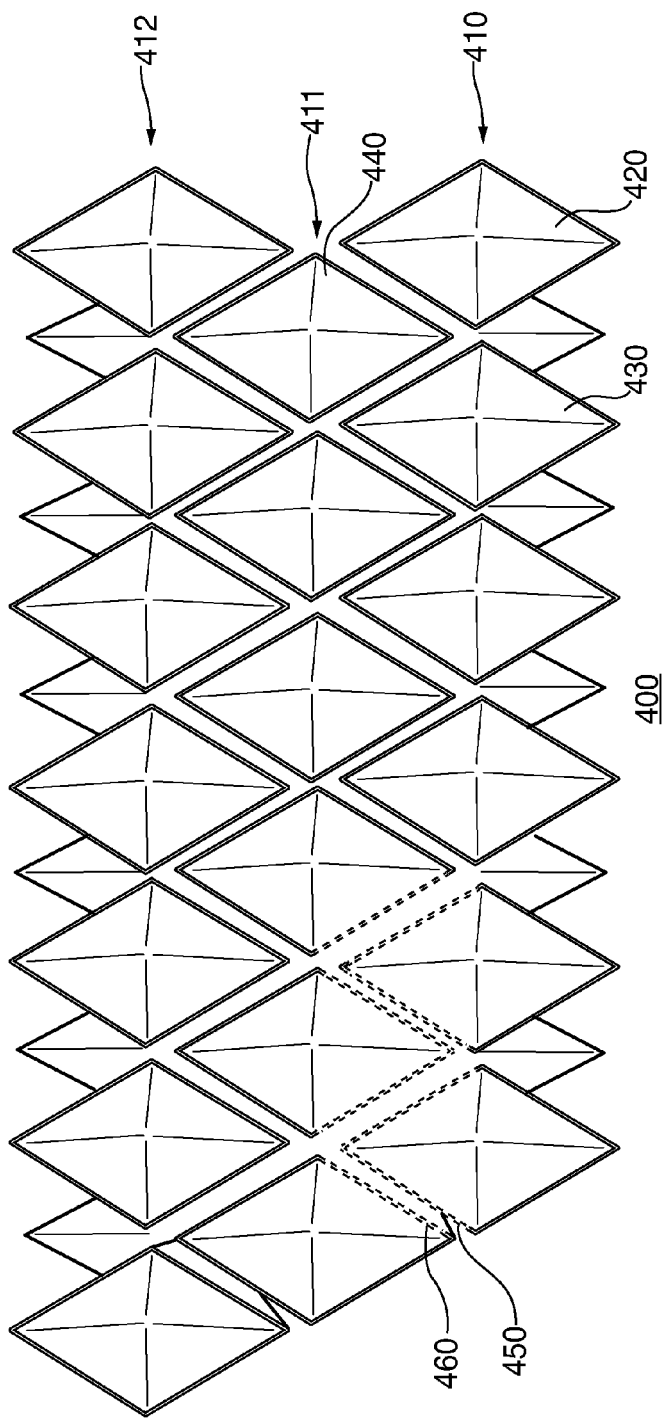

Referring now to FIGS. 4A and 4B, a partially assembled pyramid waffle core structure 400 including three rows 410, 411, 412 is shown. The open ends of the pyramids with the upward facing bases mate together at the outer edges, e.g., pyramid 440 of row 411 has one outer tip that fits between the extensions of pyramids 420 and 430 of row 410. Once the rows 410, 411, 412 are pressed together, the upper and lower edges are fused together, at least at the vertices of each pyramid base. A portion of the mating edges of rows 410 and 411 are shown by the dotted lines 450 and 460 in FIGS. 4A and 4B. The pyramid waffle cores structure 100 can be easily modified to form angled or contoured panels. In particular, one of ordinary skill in the art will readily recognize that similar methods to those used to create angled or contoured honeycomb panels may be used. Further, as one of ordinary skill in the art will readily recognize, the partially assembled pyramid waffle core structure 400 shown in FIGS. 4A and 4B can include as many rows needed to achieve the desired panel length or width. The present structure 100 also provides further sound insulation based on the closed-in spaces 470 between each row, e.g., between rows 410 and 411 and between rows 411 and 412.

Figure 5:
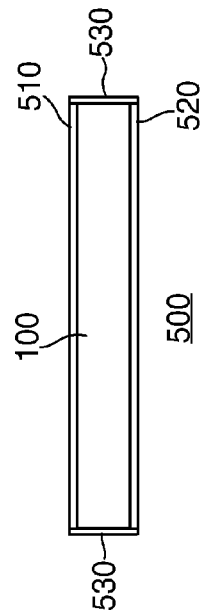
FIG. 5 is a side view of a panel including the pyramid waffle core of the present disclosure.

Referring now to FIG. 5, a panel 500 according the present disclosure includes a pyramid waffle core 100 formed in accordance with the foregoing that is sandwiched between outer panels 510, 520. Panels 510, 520 may be formed from a porous thermoplastic material for acoustical applications or a solid metal (e.g., aluminum) for structural applications, and are bonded to the pyramid waffle core 100 using conventional techniques, e.g., adhesives. Side panels 530 may also be included, although in some situations may not be necessary. Side panels 530 are preferably formed from the same material as panels 510, 520 and are bonded to the pyramid waffle core 100 in the same manner as panels 510, 520. Panel 500 includes a pyramid waffle core 100 that provides a high level of stiffness with respect to transverse loads in addition to a high level of resistance to shear stresses and side-loading, while being less costly to manufacture than prior honeycomb-based solutions since no additional space-filling steps are necessary due to the closed nature of the adjacent pyramid-like structures included in each row.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A structural core comprising:
   a single layer of adjacent hollow pyramid-like structures, wherein the single layer is comprised of at least two rows of the adjacent hollow pyramid-like structures, each pyramid-like structure formed from four faces having substantially straight edges and having an open base, each open base in one of the at least two rows offset with respect to each open base in an adjacent another of the at least two rows, the edges of each adjacent pyramid-like structure combining to form a truss-like structure for providing support against transverse loads applied to the structural core.

2. The structural core of claim 1, wherein the hollow pyramid-like structures have upward facing open bases.

3. The structural core of claim 1, wherein the hollow pyramid-like structures have downward facing open bases.

4. The structural core of claim 1, wherein the hollow pyramid-like structures have alternate upward facing and downward facing open bases.

5. The structural core of claim 1, wherein the single layer of hollow pyramid-like structures is formed in rows and columns of adjacent hollow pyramid-like structures.

6. The structural core of claim 1, wherein the single layer of hollow pyramid-like structures is formed from a partially porous material.

7. The structural core of claim 6, wherein the partially porous material is one of a woven thermoplastic, woven carbon fiber, fiberglass and paper.

8. The structural core of claim 1, wherein the single layer of hollow pyramid-like structures is formed from a solid non-porous material.

9. The structural core of claim 8, wherein the solid non-porous material is a metal.

10. A structural core, comprising:
a plurality of rows bonded together laterally, each row formed from two ribbons, each ribbon having upper and lower edges forming a zig-zag pattern having an upper point and a lower point, each upper point of the zig-zag pattern on the upper edge directly above an adjacent upper point of the zig-zag pattern on the lower edge and each lower point of the zig-zag pattern on the upper edge directly above an adjacent lower point on the lower edge, the two ribbons bonded together along bonding lines running from each lower point of the zig-zag pattern on the upper edge to the two adjacent upper points of the zig-zag pattern on the lower edge, each ribbon having bend lines running from each upper and lower points of the zig-zag pattern on the upper edge to the adjacent respective upper and lower points of the zig-zag pattern on the lower edge, wherein the upper points of the zig-zag pattern on the upper edge and the lower points of the zig-zag pattern on the lower edge expand laterally as the two ends of the row are moved together, forming adjacent hollow pyramid-like structures having alternate upward-facing and downward-facing open bases, each hollow pyramid-like structure formed from four faces having substantially straight edges, each open base in one of the plurality of rows offset with respect to each open base in an adjacent another of plurality of rows, the edges of each adjacent pyramid-like structure combining to form a truss-like structure for providing support against transverse loads applied to the structural core.

11. The structural core of claim 10, wherein the plurality of rows are bonded together by bonding vertices of each upward-facing and downward-facing hollow pyramid-like structures in each row to the adjacent row.

12. The structural core of claim 10, wherein the ribbons are formed from a partially porous material.

13. The structural core of claim 12, wherein the partially porous material is one of a woven thermoplastic, woven carbon fiber, fiberglass and paper.

14. The structural core of claim 10, wherein the ribbons are formed from a solid non-porous material.

15. The structural core of claim 14, wherein the solid non-porous material is a metal.

16. A method of forming a structure, comprising the steps of:
forming a plurality of ribbons, each ribbon having upper and lower edges forming a zig-zag pattern having an upper point and a lower point, each upper point of the zig-zag pattern on the upper edge directly above an adjacent upper point of the zig-zag pattern on the lower edge and each lower point of the zig-zag pattern on the upper edge directly above an adjacent lower point on the lower edge;
forming a plurality of rows, each row formed from two ribbons bonded together along bonding lines running from each lower point of the zig-zag pattern on the upper edge to the two adjacent upper points of the zig-zag pattern on the lower edge, each ribbon having bend lines running from each upper and lower points of the zig-zag pattern on the upper edge to the adjacent respective upper and lower points of the zig-zag pattern on the lower edge, wherein the upper points of the zig-zag pattern on the upper edge and the lower points of the zig-zag pattern on the lower edge expand laterally as the two ends of the row are moved together, forming adjacent hollow pyramid-like structures having alternate upward-facing and downward-facing open bases, each hollow pyramid-like structure formed from four faces having substantially straight edges, each open base in one of the plurality of rows offset with respect to each open base in an adjacent another of the plurality of rows, the edges of each adjacent pyramid-like structure combining to form a truss-like structure for providing support against transverse loads applied to the structure; and
bonding the plurality of rows together laterally to create a structural core having a plurality of rows and columns of adjacent hollow pyramid-like structures.

17. The method of claim 16, wherein the bonding step is performed by bonding vertices of each hollow pyramid-like structure in each row to the adjacent row.

18. The method of claim 16, further comprising the step of forming the structural core into a predetermined contoured shape.

19. The method of claim 16, further comprising the step of forming the structural core into a predetermined angled shape.

20. The method of claim 16, further comprising the step of bonding panels to a respective upper and lower surface of the structural core to create a panel structure including the structural core sandwiched between the two panels.

* * * * *